US007705802B2

(12) United States Patent
Park

(10) Patent No.: US 7,705,802 B2
(45) Date of Patent: Apr. 27, 2010

(54) METHOD FOR PERFORMING HIGH-SPEED ERROR DIFFUSION AND PLASMA DISPLAY PANEL DRIVING APPARATUS USING THE SAME

(75) Inventor: Seung-Ho Park, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1054 days.

(21) Appl. No.: 10/913,695

(22) Filed: Aug. 5, 2004

(65) Prior Publication Data

US 2005/0063607 A1 Mar. 24, 2005

(30) Foreign Application Priority Data

Aug. 12, 2003 (KR) ...................... 10-2003-0055838

(51) Int. Cl.
*G06K 9/36* (2006.01)

(52) U.S. Cl. ......................... 345/60; 348/624; 348/573; 382/252; 382/273; 382/270; 382/261; 345/204; 358/466; 358/3.03

(58) Field of Classification Search ................... 345/60, 345/573; 348/573
See application file for complete search history.

(56) References Cited

U.S. PATENT DOCUMENTS 5,271,070 A * 12/1993 Truong et al. ............... 382/234
5,388,167 A * 2/1995 Koga et al. .................. 382/232
5,519,791 A * 5/1996 Webb et al. ................. 382/252
5,553,165 A * 9/1996 Webb et al. ................. 382/252
5,570,461 A * 10/1996 Yokomizo ................... 345/616
5,604,605 A * 2/1997 Moolenaar ................. 358/3.03
5,726,718 A * 3/1998 Doherty et al. ............. 348/771
5,892,851 A * 4/1999 Nguyen ...................... 382/252
5,937,146 A * 8/1999 Tateno et al. ................ 358/1.9
5,974,228 A * 10/1999 Heitsch ...................... 358/1.9
6,069,609 A * 5/2000 Ishida et al. ................ 345/596
6,307,978 B1 * 10/2001 Metaxas ..................... 382/252
6,556,214 B1 * 4/2003 Yamada et al. .............. 345/616
6,965,389 B1 * 11/2005 Masuji et al. ............... 345/690
6,995,802 B2 * 2/2006 Sugimoto ................... 348/573
7,098,876 B2 * 8/2006 Jeong et al. .................. 345/63

(Continued)

FOREIGN PATENT DOCUMENTS

CN 1386005 A 12/2002

(Continued)

OTHER PUBLICATIONS

Patent Abstracts of Japan, Publication No. 06-318051, dated Nov. 15, 1994, in the name of Masatsugu Kimura et al.

(Continued)

*Primary Examiner*—Sumati Lefkowitz
*Assistant Examiner*—Grant D Sitta
(74) *Attorney, Agent, or Firm*—Christie, Parker & Hale, LLP

(57) ABSTRACT

A method for diffusing errors in a display device. Each frame of an input video signal is separated into at least two independent subframes. An error diffusion process is applied to each subframe of at least two independent subframes. The errors transmitted reciprocally from subframes are partially mixed, and the error diffusion process is applied to the mixed errors at each independent subframe.

17 Claims, 8 Drawing Sheets

U.S. PATENT DOCUMENTS

| | | | | |
|---|---|---|---|---|
| 7,161,634 | B2 * | 1/2007 | Long | 348/624 |
| 7,460,275 | B2 * | 12/2008 | Kempf | 358/3.03 |
| 2001/0028347 | A1 * | 10/2001 | Kawahara et al. | 345/204 |
| 2002/0003632 | A1 * | 1/2002 | Nakano et al. | 358/1.9 |
| 2003/0193451 | A1 * | 10/2003 | Kimura | 345/60 |
| 2004/0174463 | A1 * | 9/2004 | Long | 348/624 |

FOREIGN PATENT DOCUMENTS

| | | | |
|---|---|---|---|
| CN | 1407790 | A | 4/2003 |
| JP | 6-318051 | | 11/1994 |
| JP | 8-44313 | | 2/1996 |
| JP | 2000-163005 | | 6/2000 |
| JP | 2001-117528 | | 4/2001 |
| JP | 2002-077612 | | 3/2002 |
| KR | 10-2002-0018900 | A | 3/2002 |
| KR | 2002-0018900 | | 3/2002 |

OTHER PUBLICATIONS

Patent Abstracts of Japan, Publication.No. 2001-117528, dated Apr. 27, 2001, in the name of Shigehiro Masuchi.

Patent Abstracts of Japan for Publication No. 08-044313, date of publication Feb. 16, 1996, in the name of Denda Isato et al.

Patent Abstracts of Japan for Publication No. 2000-163005, date of publication Jun. 16, 2000, in the name of Yamada Kazuhiro et al.

Korean Patent Abstract, Publication No. 1020020018900 A, Published on Mar. 9, 2002, in the name of Kim, et al.

* cited by examiner

[ 1 Frame (Width × length : n(=2p) × m) ]

[ even pixel Frame ]
(Width × length : n × m)

[ odd pixel Frame ]
(Width × length : n × m)

FIG.4
$$\begin{bmatrix} w_{-1,-1} & w_{0,-1} & w_{1,-1} \\ w_{-1,0} & * & \end{bmatrix} = \begin{bmatrix} 1 & 5 & 3 \\ 7 & * & \end{bmatrix} \times \frac{1}{16}$$
FIG.5A
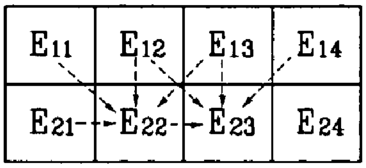
FIG.5B
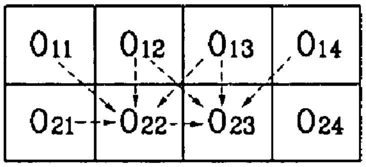
FIG.5C
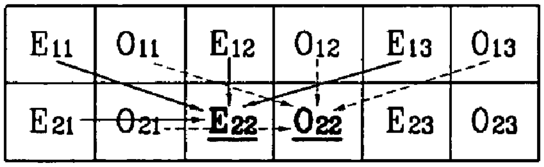

FIG.12
$$\begin{bmatrix} & w_{0,-1} & w_{1,-1} & w_{2,-1} \\ w_{-1,0} & * & & \end{bmatrix} = \begin{bmatrix} & 1 & 5 & 3 \\ 7 & * & & \end{bmatrix} \times \frac{1}{16}$$
FIG.13A
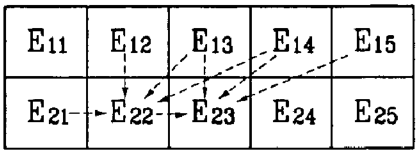
FIG.13B
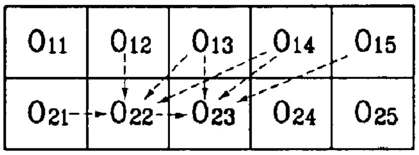
FIG.13C
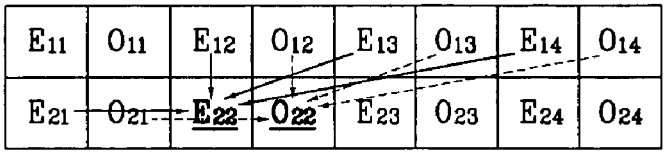
FIG.14
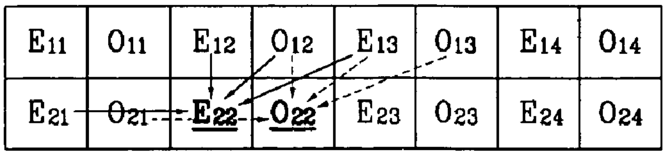

METHOD FOR PERFORMING HIGH-SPEED ERROR DIFFUSION AND PLASMA DISPLAY PANEL DRIVING APPARATUS USING THE SAME

CROSS REFERENCE TO RELATED APPLICATION

This application claims priority to and the benefit of Korea Patent Application No. 2003-55838 filed on Aug. 12, 2003 in the Korean Intellectual Property Office, the entire content of which is incorporated herein by reference.

BACKGROUND OF THE INVENTION (a) Field of the Invention

The present invention relates to a method for diffusing error in a display device, and more particularly, to a method for performing high-speed error diffusion, and a plasma display panel driving apparatus using the same.

(b) Description of the Related Art

Generally, in various display devices, such as Plasma Display Panels (PDPs), Liquid Crystal Displays (LCDs), and Organic Electro Luminescence Displays (OLEDs), error diffusion methods are usually applied for compensation when the amount of displayable gray data is less than that of gray data for display. Particularly, the error diffusion method is usually used for inverse gamma correction or for false contour reduction. The error diffusion method transmits errors to surrounding pixels, which occur from displayable gray data and gray data desired for display, and express the gray data desired for display on an average in a certain area.

An example of a conventional error diffusion method is described in Korea Patent Publication No. 2002-18900 entitled "A gamma display correction apparatus for plasma display panel, and method using the same".

FIG. 1 shows a conventional error diffusion method for inverse gamma correction applied for driving a plasma display panel. In the conventional plasma display, analog video signal 10 is inputted. The analog signal is converted to an N-bit digital signal by A/D (Analog/Digital) conversion 20, and is outputted. The signal outputted for each pixel is outputted through A/D conversion, and a frequency of the pixel signal outputted becomes 60×n×m (Hz) by the National Television Standard Committee (NTSC) method of 60 Hz. Further, the size of the frame outputted becomes width×length=n×m.

The signal outputted by A/D conversion is inverse gamma corrected 40 for compensating gamma correction performed for display in a Cathode Ray Tube (CRT). Then, when the inverse gamma corrected signal is converted to gray data displayable on the PDP, conventional error diffusion 50 is applied to the converted gray data for compensating loss of gray data, and the signal is outputted to PDP 60 for displaying a corresponding image.

Further, as the evolution of video display devices progresses, the number of frames for display increases in order to display a high quality image. As such, the number of pixels for operating in a limited time frame increases as the display devices are further developed. Error diffusion is performed at each inputted pixel by the conventional error diffusion method, and thus it is difficult to perform a real-time error diffusion process.

Thus, as the number of pixels for operating in the limited time frame increases in the high definition display device, a method for performing high-speed error diffusion is required.

SUMMARY OF THE INVENTION

In accordance with present invention a method is provided for performing high-speed error diffusion by performing an error diffusion process to at least two continuous pixels. A plasma display panel driving apparatus using the same is also provided.

To solve the above problems, one aspect of the present invention is a method for diffusing error in a display device. Each frame of an input video signal is separated into at least two independent subframes. An error diffusion process is applied to each subframe of at least two independent subframes in which the errors transmitted reciprocally from subframes are partially mixed, and the error diffusion process is applied to the mixed errors at each independent subframe.

In one exemplary embodiment at least two independent subframes are an odd subframe group, which is a group of pixels located in odd numbered lines of one frame, and an even subframe group, which is a group of pixels located in even numbered lines of one frame.

Further, in another exemplary embodiment errors for an error diffusion process in an odd subframe group and errors transmitted from pixels in an even subframe group close to a subject pixel are added, and an error diffusion process is applied to the mixed errors.

In a still further exemplary embodiment the pixels in an even subframe group for transmitting the error are located in higher lines than the pixels in the odd subframe group to which the transmitted errors to be mixed are added.

In another exemplary embodiment for an error diffusion process in an even subframe group, errors transmitted from pixels in the odd subframe group close to a subject pixel are added, and an error diffusion process is applied to the mixed errors.

Further, in a yet another exemplary embodiment pixels in the odd subframe group for transmitting the error is located in higher lines than pixels in the even subframe group to which the transmitted errors to be mixed are added.

Further, in still yet another exemplary embodiment the location of pixels transmitting the errors is determined depending on the type of error diffusion coefficient for determining the errors.

Another aspect of the present invention is a plasma display panel driving apparatus. An analog/digital converter converts an input analog video signal to a digital video signal and outputs the digital signal. The analog/digital converter separates each frame of the video signal into at least two independent subframes and outputs the subframe data. An inverse gamma corrector performs inverse gamma correction to at least two independent subframes outputted from the analog/digital converter based on properties of the plasma display panel. An error diffusing unit converts the data outputted from the inverse gamma corrector to gray data displayable on the PDP by applying an error diffusion process to data, and outputting the gray data. The error diffusing unit applies an error diffusion process to each subframe of at least two independent subframes in which the errors transmitted reciprocally from subframes are partially mixed.

The error diffusing unit includes an odd subframe error diffusing unit and an even subframe error diffusing unit. The odd subframe error diffusing unit performs an error diffusion process to the odd subframe group, a group of odd numbered pixels among at least two independent subframes. The odd subframe error diffusing unit mixes errors transmitted from pixels close to the subject pixel which are located in an even subframe group, and a group of even numbered pixels among at least two independent subframes, and applies an error diffusion process to the mixed errors. An even subframe error diffusing unit performs an error diffusion process to the even subframe group among at least two independent subframes. The even subframe error diffusing unit mixes errors transmitted from pixels close to the subject pixel which are located in an odd subframe group among at least two independent subframes, and applies an error diffusion process to the mixed errors.

Further, the odd subframe error diffusing unit includes: a first adder for adding errors transmitted from pixels close to a subject pixel to gray data of the odd subframe group outputted from the inverse gamma corrector, and outputting the gray data; a first gray data converter for converting the gray data outputted from the adder to gray data displayable on a PDP and outputting the gray data to the PDP; a second adder for calculating an error between the gray data outputted from the first adder and the gray data outputted from the first gray data converter, and outputting the error; a first delay unit for delaying the error outputted from the second adder by one pixel, and outputting the error; a first line memory for delaying the error outputted from the second adder by one line, and outputting the error to the even subframe error diffusing unit; and a first error diffusion coefficient unit for applying the predetermined error diffusion coefficient to the error delayed and outputted by the first delay unit and the first line memory, and outputting the error obtained and the error outputted from the even subframe error diffusing unit to the first adder.

Further, the even subframe error diffusing unit includes: a third adder for adding errors transmitted from pixels close to a subject pixel to the gray data of the even subframe group outputted from the inverse gamma corrector, and outputting the gray data; a second gray data converter for converting the gray data outputted from the third adder to gray data displayable on the PDP and outputting to the PDP; a fourth adder for calculating an error between the gray data outputted from the third adder and the gray data outputted from the second gray data converter, and outputting the error; and a second delay unit for delaying the error outputted from the fourth adder by one pixel, and outputting the error; a second line memory for delaying the error outputted from the fourth adder by one line, and outputting the error to the odd subframe error diffusing unit; and a second error diffusion coefficient unit for applying the predetermined error diffusion coefficient to the error delayed and outputted from the second delay unit and the fourth line memory, and outputting the error obtained and the error outputted from the odd subframe error diffusing unit to the third adder.

Another aspect of the present invention is a method for diffusing error in a display device. Data corresponding to at least two pixels adjoining each other in display of an input frame is received simultaneously. An error diffusion process is applied to the at least two pixels inputted simultaneously, wherein each error transmitted from at least two pixels are mixed and the error diffusion process is applied to the mixed errors for application of the error diffusion process to the at least two pixels.

In an exemplary embodiment at least two pixels adjoin each other and input simultaneously are an odd numbered pixel and an even numbered pixel close to the odd numbered pixel. In the case where error diffusion processes are simultaneously applied to the at least two pixels, for applying an error diffusion process to the odd numbered pixel, the error transmitted from the previous odd numbered pixel and the error transmitted from the previous even numbered pixel close to the odd numbered pixel are mixed. The error diffusion process is applied to the mixed errors. For applying an error diffusion process to the even numbered pixel, the error transmitted from the previous even numbered pixel and the error transmitted from the previous odd numbered pixel close to the even numbered pixel are mixed and the error diffusion process is applied to the mixed errors.

Further, in an exemplary embodiment the odd numbered pixel transmitting the mixed errors is located in higher lines than the even numbered pixel to which the mixed errors are applied.

Further, in another exemplary embodiment the even numbered pixel transmitting the mixed errors is located in higher lines than the odd numbered pixel to which the mixed errors are applied.

BRIEF DESCRIPTION OF THE DRAWINGS

FIG. 4 shows the Floyd-Steinberg coefficient, a general error diffusion coefficient.

FIG. 5A shows a diagram of a process for transmitting errors of each subframe using the Floyd-Steinberg coefficient for a frame of even numbered pixels, FIG. 5B shows a diagram of a process for transmitting errors of each subframe using the Floyd-Steinberg coefficient for a frame of odd numbered pixels.

FIG. 5C shows a diagram of a process for transmitting errors of each subframe using the Floyd-Steinberg coefficient for a total process for transmitting errors.

FIG. 12 shows a FAN coefficient, a general error diffusion coefficient.

FIG. 13A shows a diagram of an independent error transmission process using a FAN coefficient for a frame of even numbered pixels, FIG. 13B shows a diagram of an independent error transmission process using a FAN coefficient for a frame of odd numbered pixels.

FIG. 13C shows a diagram of an independent error transmission process using a FAN coefficient for a total process for transmitting errors.

FIG. 14 shows a diagram of a mixing type error transmission process applied with the FAN coefficient according to the exemplary embodiment.

DETAILED DESCRIPTION

Figure 1:
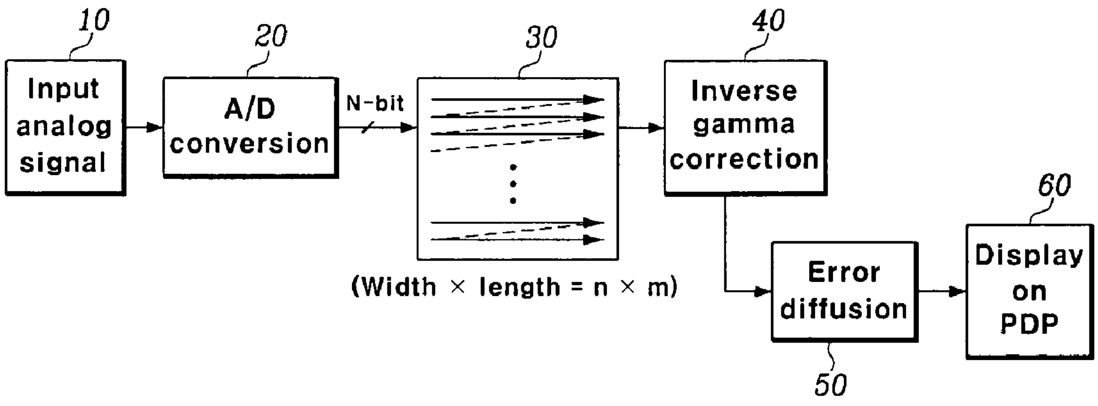
FIG.1 (Prior Art)
FIG. 1 shows a conventional error diffusion method for inverse gamma correction applied for driving a plasma display panel.
Figure 2:
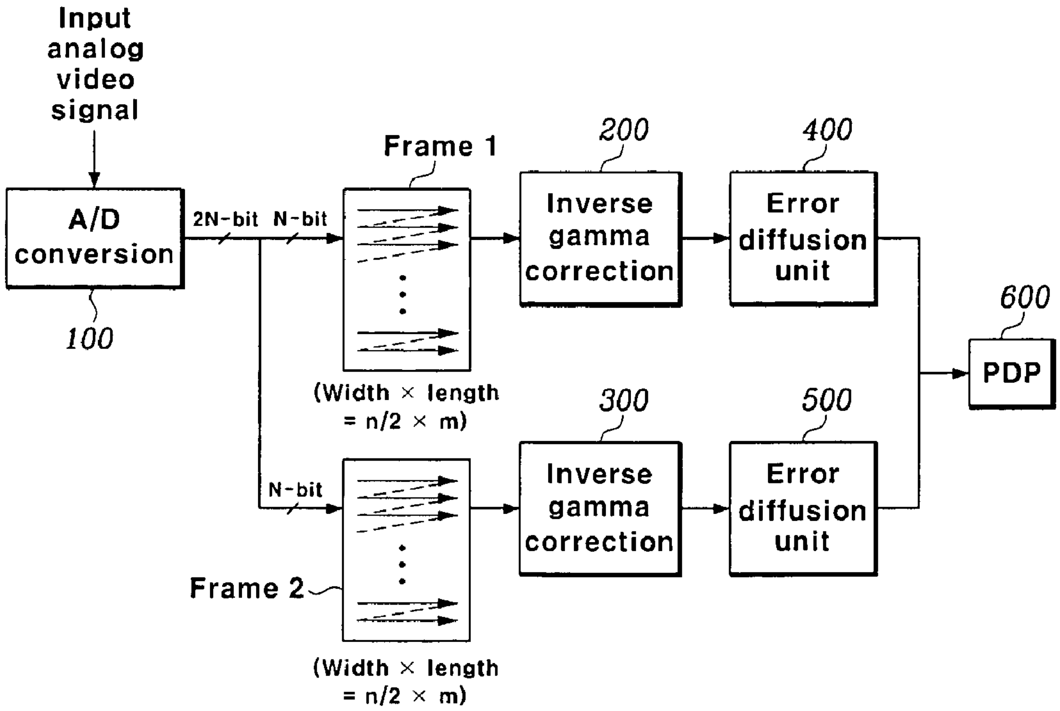
FIG. 2 shows a block diagram of a plasma display panel driving apparatus applying a method for performing high speed error diffusion, according to the exemplary embodiment.

Referring to FIG. 2, a block diagram is shown of a plasma display panel driving apparatus applying a method for performing high speed error diffusion according to an exemplary embodiment of the present invention. A plasma display panel driving apparatus includes A/D converter 100, inverse gamma correctors 200, 300, and error diffusing units 400, 500.

A/D converter 100 converts an input analog video signal to a digital video signal and outputs the digital video signal. When the analog video signal is converted to the digital video signal, the A/D converter outputs two continuous pixel signals independently at the same time. Thus, in the case where a video signal of one frame is converted and outputted in A/D converter 100, independent frame data (frame 1, frame 2) are formed, of which sizes are half of that of one frame. In this case, the size of each of frame 1 and frame 2 becomes width×legnth=n/2×m.

As such, A/D converter 100 outputs two continuous pixel signals independently at the same time, and since the frequency of a pixel signal is 60 Hz (that is, the NTSC method), the size of the frame becomes 60×(½)×n×m. Thus, the size of the frame is reduced to ½ that of the frame when the conventional frequency is applied, and real time calculation can be easily performed.

Two inverse gamma correctors 200, 300 perform inverse gamma correction for each of the two independent frame data 1 and frame data 2 corresponding to each of the two continuous pixel signals outputted from A/D converter 100.

Further, two error diffusing units 400, 500 correct data lost at conversion from output data to gray data displayable on PDP 600, and output the gray data to the PDP. The output data is inverse gamma corrected at two inverse gamma correctors 200, 300.

PDP 600 receives data outputted respectively from two error diffusing units 400, 500, and mixes the data and outputs the corresponding video image. In this case, a combining unit for combining data outputted respectively from two error diffusing units 400, 500 and a driving unit for generating subfield-related data from the mixed data and driving PDP 600 etc. are known to an ordinary person in the art. Thus, explanations for the units are not described herein.

Figure 3A:
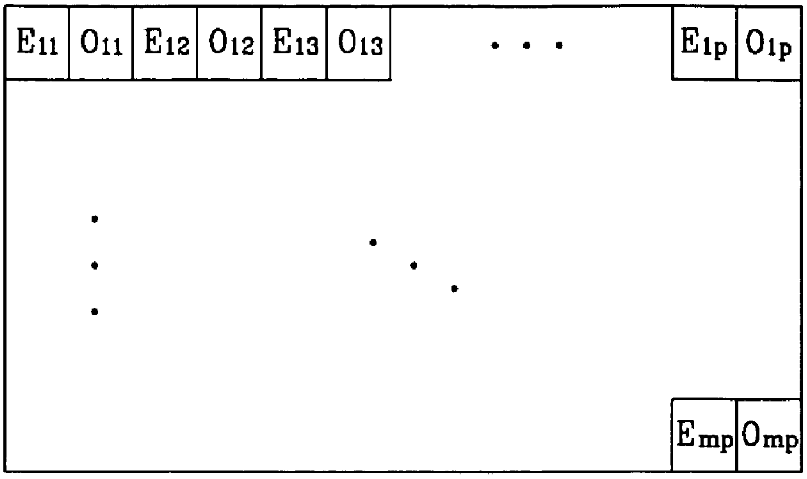
FIG. 3A shows a diagram of a construction of a frame data inputted to an A/D converter for two frame data shown in FIG. 2.
Figure 3B:
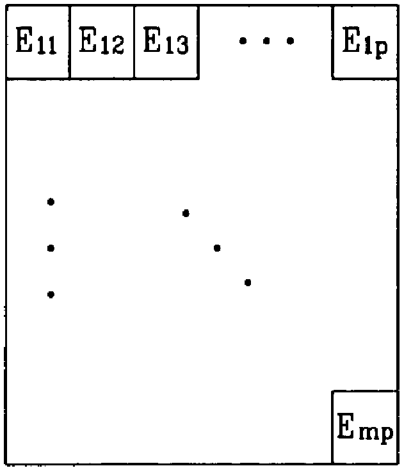
FIGS. 3B and 3C show construction of two frame data outputted from the A/D converter for two frame data shown in FIG. 2.
Figure 3C:
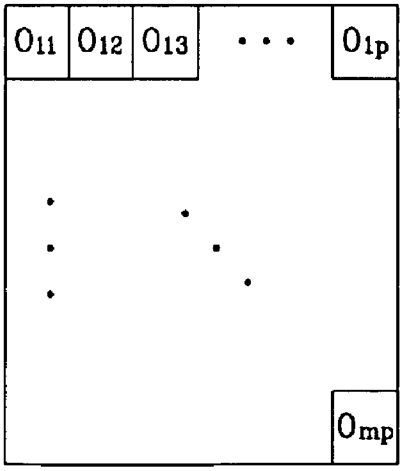

FIGS. 3A-3C show diagrams of construction for the two frame data shown in FIG. 2, wherein FIG. 3A is a construction of a frame data inputted to an A/D converter, and FIG. 3B and FIG. 3C show construction of two frame data outputted from the A/D converter.

As shown in FIGS. 3A-3C, of the total frame data inputted to A/D converter 100, two continuous pixels are indicated as E pixels (even numbered pixel) and O pixels (odd numbered pixel). The two continuous pixel signals are simultaneously outputted from A/D converter 100, and form two sets of frame data. The two sets of frame data are separated into a frame of even numbered pixels (frame 1), a group of E pixels located in an even line; and a frame of odd numbered pixels (frame 2), a group of O pixels located in an odd line formed independently.

The method for diffusing error is applied to each of the two frame data formed independently in error diffusing units 400, 500. In this case, an error diffusion coefficient affects image quality. The method for diffusing errors transmits errors between gray data to surrounding pixels. When the errors are transmitted to surrounding pixels, the errors are separated by the predetermined weight at the predetermined location, and the separated error are transmitted. The weight is referred to an error diffusion coefficient, and there is the Floyd-Steinberg coefficient among known error diffusion coefficients. The Floyd-Steinberg coefficient is shown in FIG. 4.

Referring to FIG. 4, one frame is separated into subframes (a frame of even numbered pixels and a frame of odd numbered pixels), and the error diffusion process is applied separately. For example, the processes for diffusing errors applying the Floyd-Steinberg coefficient in each subframe are shown in FIG. 5A and FIG. 5B. The two processes for diffusing error in two frames are mixed to become one process for diffusing error in one frame which is shown in FIG. 5C.

The error transmitted from one frame to one pixel shown in FIG. 5A and the error transmitted from one frame to one pixel shown in FIG. 5B can be calculated according to following an equation 1 and equation 2, respectively.

$$E_{sum}{}^{e}(2,2)=w_{-1,-1}\times E_{even}(1,1)+w_{0,-1}\times E_{even}(2,1)+w_{1,-1}\times E_{odd}(^{3,1})+w_{-1,0}\times E^{even}(1,2) \quad \text{[Equation 1]}$$

$$E_{sum}{}^{o}(2,2)=w_{-1,-1}\times E_{odd}(1,1)+w_{0,-1}\times E_{even}(2,1)+w_{1,-1}\times E_{odd}(3,1)+w_{-1,0}\times E_{even}(1,2) \quad \text{[Equation 2]}$$

Here, $E_{sum}{}^{e}(x,y)$ indicates a sum of errors transmitted when performing the error diffusion process to an (x,y) pixel in the frame of even numbered pixels, and $E_{sum}{}^{o}(x,y)$ indicates a sum of errors transmitted when performing error diffusion process to an (x,y) pixel in the frame of odd numbered pixels.

Figure 6A:
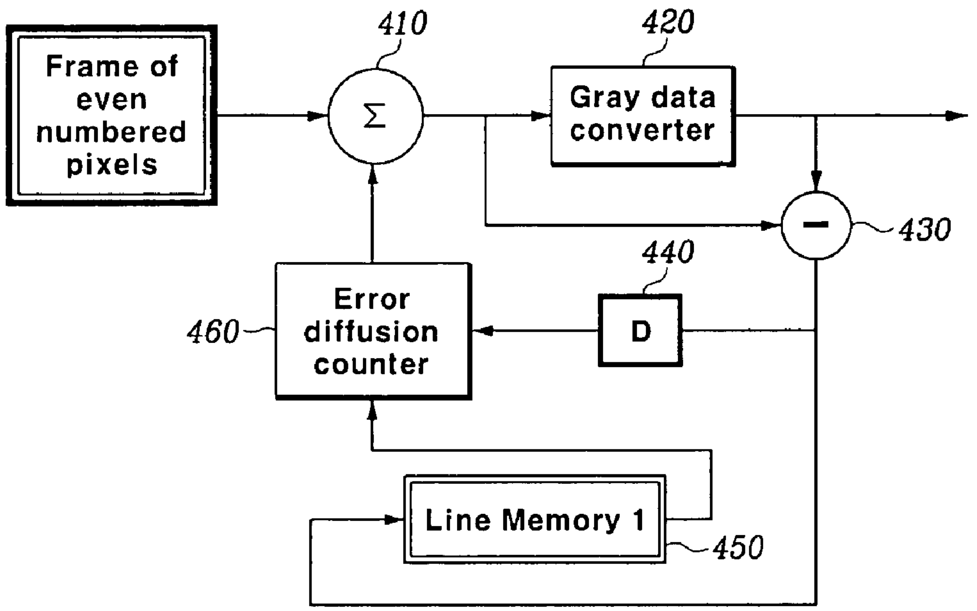
FIG. 6A shows a block diagram of the error diffusing units shown in FIG. 2 for performing error diffusion process in the frame of even numbered pixels.
Figure 6B:
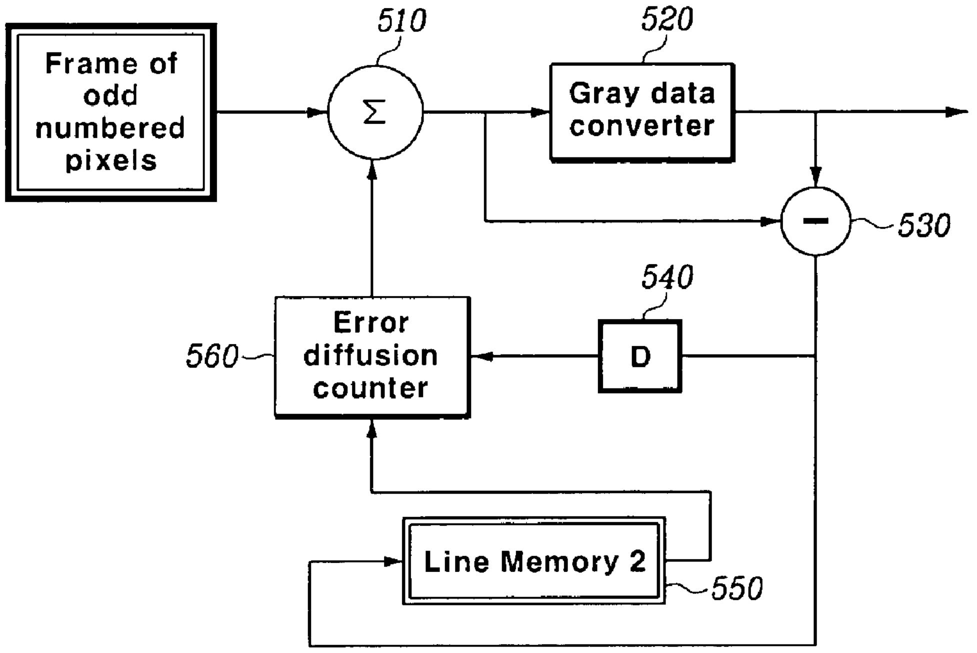
FIG. 6B shows a block diagram of the error diffusing units shown in FIG. 2 for performing an error diffusion process in the frame of odd numbered pixels.

FIGS. 6A and 6B show block diagrams of error diffusing units 400, 500 shown in FIG. 2. FIG. 6A depicts error diffusing unit 400 for performing the error diffusion process in the frame of even numbered pixels, and FIG. 6B depicts error diffusing unit 500 for performing the error diffusion process in the frame of odd numbered pixels.

As shown in . . . 6A, error diffusing unit 400 includes adders 410, 430, gray converter 420, line memory 450, and error diffusion coefficient unit 460.

Adder 410 adds an error outputted from the error diffusion coefficient unit 460 to the gray of the frame of even numbered pixels outputted from A/D converter 100 and inverse gamma corrector 200, and outputs the gray data to gray data converter 420 and adder 430.

Gray data converter 420 converts the gray data outputted from adder 410 to gray data displayable on PDP 600 shown in FIG. 2, and outputs the gray data to PDP 600 and adder 430.

Adder 430 is for calculating an error between the gray data outputted from adder 410 and the gray data outputted from gray data converter 420, and outputting the error to delay unit 440 and line memory 1 450.

Delay unit 440 delays the error outputted from adder 430 by one pixel, and outputs the error to an error diffusion coefficient unit.

First line memory 450 delays the error outputted from adder 430 during one line, and outputs the error to error diffusion coefficient unit 460.

The error diffusion coefficient unit applies the predetermined error diffusion coefficient to the error delayed and outputted from delay unit 440 and first line memory 450, for example the Floyd-Steinberg coefficient, and outputs an error obtained to first adder 410.

The operation of error diffusing unit 400 is as follows. First, the gray data of the frame of even numbered pixels is outputted from inverse gamma corrector 200 through A/D converter 100. In the case where the gray data is inputted to adder 410, the error transmitted to the present pixel and processed by error diffusion coefficient unit 460 is added to adder 410. Then, the resulting gray data, the sum of the gray data and the error, is converted to gray data displayable on PDP 600, and is outputted to PDP 600.

Adder 430 calculates a difference between the gray data converted by gray data converter 420 and the gray data before conversion, and outputs the result difference as an error. Delay unit D 440 delays the error by one pixel for transmitting an error of the next even numbered pixel. First line memory 450 delays the error by one line for transmitting the error of the next line. The error diffusion coefficient unit applies an error diffusion coefficient to the errors obtained, which responds to the pixel for transmitting and outputs errors to adder 410.

Error diffusing unit 500 shown in FIG. 6B includes adders 510, 530, a gray data converter 520, delay unit D 540, second line memory 550, and error diffusion coefficient unit 560. Error diffusing unit 500 has the same construction and operation action as error diffusing unit 400, except that the input gray data is the gray data of frames of odd numbered pixels. Though a detailed explanation is not described herein, construction and operation of error diffusing unit 500 can be easily understood by an ordinary person in the art.

Figure 7:
FIG. 7 shows a diagram for an 8 bit test image.
Figure 8:
FIG. 8 shows an image result from an independent error transmitting process shown in FIGS. 5A-5C.

Referring back to FIG. 5C, since error diffusion processes are applied to each independent frame, the distance of error transmission to one pixel increases, viewed in the whole frame display. FIG. 8 shows an image result for constructing two independent frames and applying independent error transmitting processes as in FIG. 3, when 8 bit video shown in FIG. 7 is inputted. In the case where each of the independent error diffusion processes are applied to the two continuous pixels, the distance of error transmission to one pixel increases to cause a low space frequency. Thus, much of the high frequency components are lost, and the video is crushed up as shown in FIG. 8.

To solve such a problem, the exemplary embodiment of the present invention applies a mixing type error transmission method wherein the gray data between the frame of even numbered pixels and the frame of odd numbered pixels are partially mixed. That is, the error transmitting in frames of even numbered pixels is performed only between even pixels, and the error transmitting in frames of odd numbered pixels is performed only between odd pixels as shown in FIG. 5C. However, the error transmitting in frames of even numbered pixels is not performed only between even pixels, and a part of errors transmitted from close odd numbered pixels is mixed with the errors transmitted from even numbered pixels. In the same manner, the error transmitting in frames of odd numbered pixels is not performed only between odd pixels, and a part of errors transmitted from close even numbered pixels is mixed with the errors transmitted from odd numbered pixels. At this time, the pixels transmitting the error to be mixed are located in higher lines than the pixel to which the transmitted error is applied, and the pixels transmitting the error for mixing is close to the pixel to which the transmitted error is applied.

Figure 9:
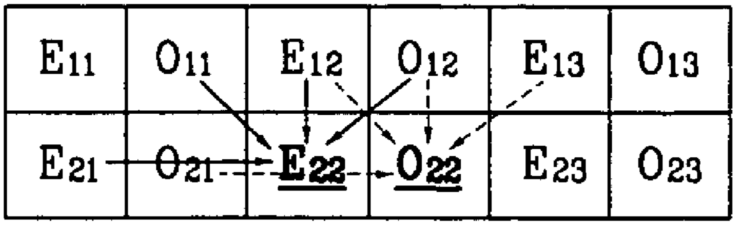
FIG. 9 shows a diagram of a mixing type error transmission process applied with the Floyd Steinberg coefficient according to the exemplary embodiment.

The mixing type error transmission method shown in FIG. 9 can be expressed as following equation 3 to equation 10.

$$I_{even}^{m}(x,y)=I_{even}(x,y)+E_{sum}^{e}(x,y) \quad \text{[Equation 3]}$$

$$I_{odd}^{m}(x,y)=I_{odd}(x,y)+E_{sum}^{o}(x,y) \quad \text{[Equation 4]}$$

$$E_{sum}^{e}(x,y)=w_{-1,-1}\times E^{odd}(x-1,y-1)+w_{0,-1}\times E_{even}(x,y-1)+w_{1,-1}\times E_{odd}(x,y-1)+w_{-1,0}\times E_{even}(x-1,y) \quad \text{[Equation 5]}$$

$$E_{sum}^{e}(x,y)=w_{-1,-1}\times E^{even}(x-1,y-1)+w_{0,-1}\times E_{odd}(x,y-1)+w_{1,-1}\times E_{even}(x,y-1)+w_{-1,0}\times E_{odd}(x-1,y) \quad \text{[Equation 6]}$$

$$O_{even}(x,y)=F(I_{even}^{m}(x,y)) \quad \text{[Equation 7]}$$

$$O_{odd}(x,y)=F(I_{odd}^{m}(x,y)) \quad \text{[Equation 8]}$$

$$E_{even}(x,y)=I_{even}^{m}(x,y)-O_{even}(x,y) \quad \text{[Equation 9]}$$

$$E_{odd}(x,y)=I_{odd}^{m}(x,y)-O_{odd}(x,y) \quad \text{[Equation 10]}$$

Here, $I_{even}(x,y)$ is an (x,y)th input pixel signal in a frame of even numbered pixels, and $I_{odd}(x,y)$ is an (x,y)th input pixel signal in a frame of odd numbered pixels; $I_{even}^{m}(x,y)$ is an (x,y)th input pixel signal in a frame of even numbered pixels to which an error is transmitted, and $I_{odd}^{m}(x,y)$ is an (x, y)th input pixel signal in frame of odd numbered pixels to which an error is transmitted; $E_{sum}^{e}(x,y)$ are errors transmitted to the (x,y)th pixel signal in a frame of even numbered pixels, and $E_{sum}^{o}(x,y)$ are errors transmitted to the (x, y)th pixel signal in a frame of odd numbered pixels; $E_{even}(x,y)$ is an error generated at the (x,y)th pixel signal in a frame of even numbered pixels, and $E_{odd}(x,y)$ is an error generated at the (x,y)th pixel signal in a frame of odd numbered pixels; $O_{even}(x,y)$ is gray data outputted from the (x,y)th pixel signal in a frame of even numbered pixels, and $O_{odd}(x,y)$ is gray data outputted from the (x,y)th pixel signal in a frame of odd numbered pixels; and F(•) is a function for determining output gray data of which a bit number is reduced.

Figure 10:
FIG. 10 an image result from the mixing type error transmission process shown in FIG. 9.

For example, in the case where the 2 bit output video is calculated from the 8 bit video according to the mixing type error transmission method of equation 3 to equation 10, the resulting video is obtained as FIG. 10. The resulting video of FIG. 10 provides a smooth expression of the video and an improved picture quality, compared with the video of FIG. 8 by the independent error transmission method.

Figure 11:
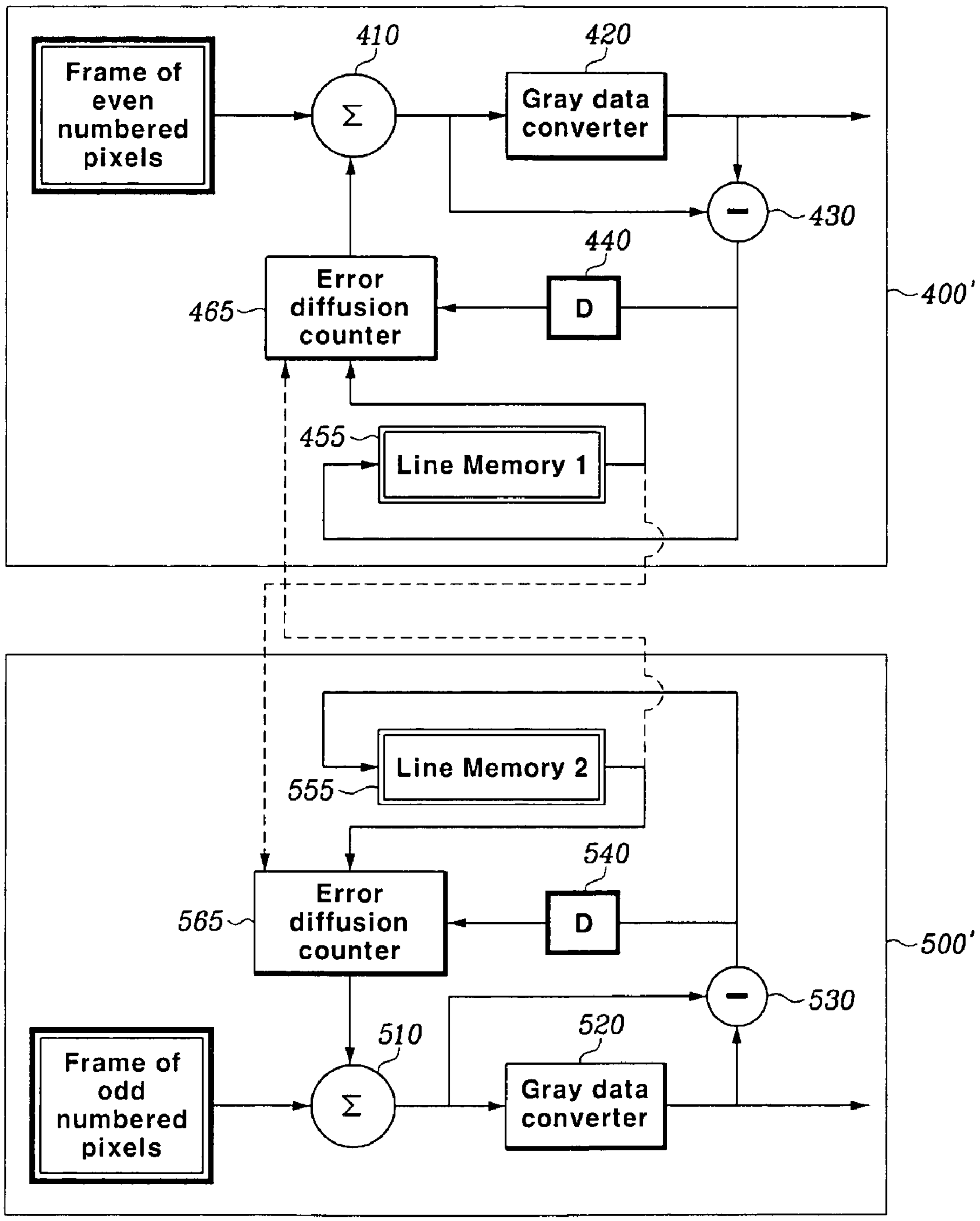
FIG. 11 shows a block diagram of an error diffusing unit to which the mixing type error transmission process is applied, according to the exemplary embodiment.

FIG. 11 shows a block diagram of error diffusing units 400', 500' to which the mixing type error transmission process is applied, according to the exemplary embodiment.

In error diffusing units 400', 500', error diffusing unit 400' applies the error diffusion process to the input frame of even numbered pixels, is similar with error diffusing unit 400 shown in FIG. 6A, and includes adders 410, 430, gray data converter 420, delay unit D,440, first line memory 455, and error diffusion coefficient unit 465 performing the same function with same reference number. Here, adders 410, 430, gray data converter 420, and delay unit 440 have the same functions as those in error diffusing unit 400 shown in FIG. 6A. Thus the detailed explanations for those are not described.

Further, error diffusing unit 500' applies the error diffusion process to the input frame of odd numbered pixels, is similar with error diffusing unit 400 shown in FIG. 6B, and includes adders 510, 530, gray data converter 520, delay unit (D, 540), second line memory 555, and error diffusion coefficient unit 565 performing the same function with the same reference number. Here, adders 510, 530, gray data converter 520, and delay unit 540 have the same function as those in error diffusing unit 500 shown in FIG. 6B. Thus the detailed explanations for those are not described.

Error diffusing units 400', 500' using the mixing type error transmission process according to the exemplary embodiment are different from error diffusing units 400, 500 shown in FIGS. 6A and 6B in the following points.

Line memory 455 of error diffusing unit 400' outputs an error delayed by one line to error diffusion coefficient unit 565 of error diffusion unit 500' in addition to error diffusion coefficient unit 465 of error diffusing unit 400', in the diffusing units according to the exemplary embodiment. In the same manner, line memory 555 of error diffusing unit 500' outputs an error delayed by one line to error diffusion coefficient unit 465 of error diffusion unit 400' in addition to error diffusion coefficient unit 565 of error diffusing unit 500', in the diffusing units according to the exemplary embodiment. That is, error diffusion coefficient unit 465 of error diffusing unit 400' mixes an error outputted from line memory 455 and an error outputted from line memory 555 of error diffusing unit 500', and transmits the result error. Error diffusion coefficient unit 565 of error diffusing unit 500' mixes an error outputted from line memory 555 and an error outputted from line memory 455 of error diffusing unit 400', and transmits the result error.

As such, instead of performing the independent error diffusing process respectively for the error diffusion in a frame of even numbered pixels, and the error diffusion in a frame of odd numbered pixels, the error diffusion process of the exemplary embodiment holds in common a part of the error diffusion process in each of line memories 455, 555, and mixes errors transmitted. Thus, the error diffusion process of the exemplary embodiment can express smooth video and achieve improved picture quality.

Equation 3 to equation 10 show that the mixing type error diffusion method of the exemplary embodiment is processed with the Floyd-Steinberg coefficient in shown FIG. 4. However, the present invention is not limited to this, and the mixing type error diffusion method of the exemplary embodiment can be processed with other error diffusion coefficients. For example, in case the independent error transmission method is performed in a frame of even numbered pixels, and a frame of odd numbered pixels, with respect to the Fan coefficient shown in FIG. 12, the errors are transmitted as shown in FIG. 13A and FIG. 13B. In the case where errors are processed in each independent frame as shown in FIG. 13C, the distance of error transmission increases. Thus the picture quality gets worse. To solve the problem, the mixing type error transmission method can be performed with the Fan coefficient. As a result, the error can be transmitted as shown in FIG. 14. The mixing type error transmission process can be expressed with equation 11 and equation 12, instead of equation 5 and equation 6.

$$E_{sum}^{e}(x,y)=w_{0,-1}\times E_{even}(x,y-1)+w_{1,-1}\times E_{odd}(x,y-1)+w_{2,-1}\times E_{even}(x+1,y-1)+w_{-1,0}\times E_{even}(x-1,y) \quad \text{[Equation 11]}$$

$$E_{sum}^{e}(x,y)=w_{0,-1}\times E_{odd}(x,y-1)+w_{1,-1}\times E_{even}(x+1,y-1)+w_{2,-1}\times E_{odd}(x+1,y-1)+w_{-1,0}\times E_{odd}(x-1,y) \quad \text{[Equation 12]}$$

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

For example, the above explanation discloses that one frame is separated into a frame of even numbered pixels and a frame of odd numbered pixels, and the mixing type error transmission method is applied for the error diffusing in each of the separated frames. The present invention is not limited to the above explanation, and even if the frame is separated into at least three frames, the mixing type error transmission method can be applied for error diffusing in each of the separated frames. In this case, the errors outputted from the separated frames can be mixed as the mixed type error transmission method shown in FIG. 9, and thus the mixed type error transmission method can be applied to at least 3 separated frames. This can be easily understood by an ordinary person in the art.

According to the present invention, the high speed error diffusion can be performed with respect to data from many pixels in a high definition display device.

Further, the high frequency component of video is improved by mixing errors of a frame of even numbered pixels and a frame of odd numbered pixels at error transmission, and thus video of improved picture quality can be obtained.

What is claimed is:

1. A method for diffusing errors in a display device, comprising:

a) separating a frame of an input video signal into at least two subframes; and b) applying an error diffusion process to each subframe of the at least two subframes utilizing an error diffusion unit corresponding to each of the at least two subframes, wherein errors from a first sub frame of the at least two sub frames are transmitted to the error diffusion unit corresponding to a second subframe of the at least two subframes, and errors from the second subframe are transmitted to the error diffusion unit corresponding to the first subframe, the errors from the first subframe are at least partially mixed with the errors from the second subframe, and an error diffusion coefficient is applied to the mixed errors, wherein a first pixel in the first subframe receives errors from the second subframe concurrently to when a second pixel in the second subframe receives errors from the first subframe, the first pixel adjoining the second pixel on a same row of the frame.

2. The method for diffusing errors of claim 1, wherein the first subframe comprises a first group of pixels located in odd numbered columns of the frame, and the second subframe comprises a second group of pixels located in even numbered columns of the frame.

3. The method for diffusing errors of claim 2, wherein for application of a first subframe error diffusion process of the error diffusion process to the first subframe, mixing the errors from the first subframe with the errors from the second subframe comprises:

using an error diffusion coefficient unit to apply the error diffusion coefficient to at least first errors and second errors, the first errors being errors transmitted from pixels among the second group of pixels that are close to pixels among the first group of pixels, and the second errors being errors transmitted from previous pixels among the first group of pixels, and adding an output of the error diffusion coefficient unit to gray data of the pixels among the first group of pixels.

4. The method for diffusing errors of claim 3, wherein the pixels among the second group of pixels are located in higher rows than the pixels among the first group of pixels.

5. The method for diffusing errors of claim 2, wherein for application of a second subframe error diffusion process of the error diffusion process to the second subframe, mixing the errors from the second subframe with the errors from the first subframe comprises:

using an error diffusion coefficient unit to apply the error diffusion coefficient to at least first errors and second errors, the first errors being errors transmitted from pixels among the first group of pixels that are close to pixels among the second group of pixels, and the second errors being errors transmitted from previous pixels among the second group of pixels, and adding an output of the error diffusion coefficient unit to gray data of the pixels among the second group of pixels.

6. The method for diffusing errors of claim 5, wherein the pixels among the first group of pixels are located in higher rows than the pixels among the second group of pixels.

7. The method for diffusing errors of claim 4, wherein the location of the pixels among the second group of pixels is determined depending on the nature of the error diffusion coefficient used for determining the diffusion of errors.

8. A plasma display panel driving apparatus for driving a plasma display panel (PDP), the plasma display panel driving apparatus comprising:

an analog/digital converter adapted to convert an input analog video signal to an output digital video signal comprising a plurality of frames, wherein the analog/digital converter is further adapted to separate each frame among the plurality of frames into subframe data comprising at least two subframes and to output the subframe data;

an inverse gamma corrector adapted to perform inverse gamma correction on at least one subframe of the subframe data outputted from the analog/digital converter based on properties of the PDP; and an error diffusing unit adapted to concurrently receive from the at least two subframes, inverse gamma corrected subframe data corresponding to at least two pixels adjoining each other in a frame of the plurality of frames, and to convert the inverse gamma corrected subframe data to PDP-displayable gray data by applying, in parallel, an error diffusion process to the inverse gamma corrected subframe data corresponding to the at least two pixels, and to output the PDP-displayable gray data, wherein the error diffusing unit is adapted to apply the error diffusion process to each subframe, the error diffusion process comprising concurrently transmitting errors from the first subframe to the second subframe and transmitting errors from the second subframe to the first subframe, and at least partially mixing the errors from the first subframe with the errors from the second subframe.

9. The plasma display panel driving apparatus of claim 8, wherein the at least two subframes comprise a first subframe and a second subframe, the first subframe comprising a first group of pixels from odd numbered columns of a frame, and the second subframe comprising a second group of pixels from even numbered columns of the frame, and wherein the error diffusing unit comprises:

a first subframe error diffusing unit for performing a first subframe error diffusion process of the error diffusion process on the first subframe, wherein the first subframe error diffusing unit is adapted to calculate first mixed errors by mixing first errors transmitted from pixels among the second group of pixels that are close to pixels among the first group of pixels, with second errors transmitted from pixels among the first group of pixels, and applying a first error diffusion coefficient to the first mixed errors; and a second subframe error diffusing unit for performing a second subframe error diffusion process of the error diffusion process on the second subframe, wherein the second subframe error diffusing unit is adapted to calculate second mixed errors by mixing third errors transmitted from pixels among the first group of pixels that are close to pixels among the second group of pixels, with fourth errors transmitted from pixels among the second group of pixels, and applying a second error diffusion coefficient to the second mixed errors.

10. The plasma display panel driving apparatus of claim 9, wherein the first subframe error diffusing unit comprises:

a first adder for adding the first mixed errors to gray data of the pixels among the first group of pixels outputted from the inverse gamma corrector, and outputting a sum of the gray data and the first mixed errors;

a first gray data converter for converting the sum of the gray data and the first mixed errors outputted from the first adder to the PDP-displayable gray data and outputting the PDP-displayable gray data to the PDP;

a second adder for calculating fifth errors as the difference between the sum of the gray data and the first mixed errors outputted from the first adder, and the PDP-displayable gray data outputted from the first gray data converter, and outputting the fifth errors;

a first delay unit for delaying the fifth errors outputted from the second adder by one pixel, and outputting the pixel-delayed fifth errors;

a first line memory for delaying the fifth errors outputted from the second adder by one line, and outputting the line-delayed fifth errors to the second subframe error diffusing unit; and a first error diffusion coefficient unit for calculating the first mixed errors by applying the first error diffusion coefficient to the pixel-delayed fifth errors, the line-delayed fifth errors, and the first errors, and outputting the first mixed errors to the first adder.

11. The plasma display panel driving apparatus of claim 9, wherein the second subframe error diffusing unit comprises:

a first adder for adding the second mixed errors to gray data of the pixels among the second group of pixels outputted from the inverse gamma corrector, and outputting a sum of the gray data and the second mixed errors;

a first gray data converter for converting the sum of the gray data and the second mixed errors outputted from the first adder to the PDP-displayable gray data and outputting the PDP-displayable gray data to the PDP;

a second adder for calculating fifth errors as the difference between the sum of the gray data and the second mixed errors outputted from the first adder, and the PDP-displayable gray data outputted from the first gray data converter, and outputting the fifth errors;

a first delay unit for delaying the fifth errors outputted from the second adder by one pixel, and outputting the pixel-delayed fifth error;

a first line memory for delaying the fifth error outputted from the second adder by one line, and outputting the line-delayed fifth error to the first subframe error diffusing unit; and a first error diffusion coefficient unit for applying the second error diffusion coefficient to the pixel-delayed fifth error, the line-delayed fifth error, and the third error, and outputting the second mixed errors to the first adder.

12. The plasma display panel driving apparatus of claim 10, wherein the pixels among the second group of pixels for transmitting the first errors are located in higher rows than the pixels among the first group of pixels for transmitting the one or more errors, with which first errors are to be mixed.

13. The plasma display panel driving apparatus of claim 11, wherein the pixels among the first group of pixels for transmitting the third errors are located in higher rows than the pixels among the second group of pixels for transmitting the one or more errors, with which the third errors are to be mixed.

14. A method for diffusing errors in a display device, comprising:

a) concurrently receiving data corresponding to at least two pixels adjoining each other in display of an input frame; and b) applying, in parallel, an error diffusion process to each of the at least two pixels by utilizing at least two subfield error diffusion units, wherein errors from a first pixel of the at least two pixels are transmitted to a second subfield error diffusion unit of the at least two subfield error diffusion units for applying the error diffusion process to a second pixel of the at least two pixels, and errors from the second pixel of the at least two pixels are transmitted to a first subfield error diffusion unit of the at least two subfield error diffusion units for applying the error diffusion process to the first pixel of the at least two pixels, and wherein errors transmitted from each of the at least two pixels are at least partially mixed with one another, and an error diffusion coefficient is applied to the mixed errors for application of the error diffusion process to the at least two pixels.

15. The method for diffusing errors of claim 14, wherein the at least two pixels comprise an odd numbered pixel and an even numbered pixel close to the odd numbered pixel;

wherein the error diffusion process applied to the odd numbered pixel comprises mixing a first error transmitted from a first previous odd numbered pixel with a second error transmitted from a first previous even numbered pixel close to the odd numbered pixel, and applying the error diffusion coefficient to the mixed first and second errors; and wherein the error diffusion process applied to the even numbered pixel comprises mixing a third error transmitted from a second previous even numbered pixel with a fourth error transmitted from a second previous odd numbered pixel close to the even numbered pixel, and applying the error diffusion coefficient to the mixed third and fourth errors.

16. The method for diffusing errors of claim 15, wherein the second previous odd numbered pixel is located in a higher line than the even numbered pixel to which the error diffusion process is applied.

17. The method for diffusing errors of claim 15, wherein the second previous even numbered pixel is located in a higher line than the odd numbered pixel to which the error diffusion process is applied.

* * * * *